(12) United States Patent
Roby et al.

(10) Patent No.: US 11,235,326 B1
(45) Date of Patent: Feb. 1, 2022

(54) FLUIDIC CONTROL: CLAMPED MEMBRANE STRUCTURE

(71) Applicant: Facebook Technologies, LLC, Menlo Park, CA (US)

(72) Inventors: Erik Roby, Seattle, WA (US); Andrew Arthur Stanley, Seattle, WA (US); Nicholas Roy Corson, Woodinville, WA (US); Katherine Healy, Redmond, WA (US); Robert Manson, Seattle, WA (US); Jack Lindsay, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 304 days.

(21) Appl. No.: 16/281,476

(22) Filed: Feb. 21, 2019

(51) Int. Cl.
| | |
|---|---|
| *B01L 99/00* | (2010.01) |
| *B01L 3/00* | (2006.01) |
| *G06F 3/01* | (2006.01) |
| *G02B 27/01* | (2006.01) |

(52) U.S. Cl.
CPC ... *B01L 3/502738* (2013.01); *B01L 3/502707* (2013.01); *B01L 3/502715* (2013.01); *G02B 27/0176* (2013.01); *G06F 3/011* (2013.01); *B01L 2400/0638* (2013.01); *G02B 2027/0178* (2013.01)

(58) Field of Classification Search
CPC ....... B01L 2400/0638; B01L 3/502707; B01L 3/502715; B01L 3/502738; B01L 99/00; B01L 3/00; G02B 27/0176; G02B 2027/0178; G06F 3/011
See application file for complete search history.

(56) References Cited

U.S. PATENT DOCUMENTS

| | | | | |
|---|---|---|---|---|
| 2010/0233037 | A1* | 9/2010 | Melin | ............... B01L 3/502738 |
| | | | | 422/537 |
| 2010/0304494 | A1* | 12/2010 | Tokhtuev | ............ B01L 3/50273 |
| | | | | 436/100 |
| 2011/0162785 | A1* | 7/2011 | Zhou | ................... F16K 99/0057 |
| | | | | 156/196 |
| 2013/0000388 | A1* | 1/2013 | Allegato | .............. B01J 19/0093 |
| | | | | 73/40.5 R |
| 2018/0085559 | A1* | 3/2018 | Laby | ..................... A61B 17/122 |
| 2018/0297029 | A1* | 10/2018 | Wang | ............... B01L 3/502707 |

* cited by examiner

*Primary Examiner* — Brian J. Sines
(74) *Attorney, Agent, or Firm* — FisherBroyles, LLP

(57) ABSTRACT

The disclosed method of manufacturing may include positioning a membrane on top of a channeled layer where the channeled layer includes a shim portion that is dimensioned to limit the amount of compression appliable to the membrane. The membrane may be positioned at a juncture in the channeled layer. The method may next include positioning a transmission housing layer membrane and the channeled layer. The method may also include fastening the channeled layer, the membrane, and the transmission housing layer together. The channeled layer, the membrane, and the transmission housing layer may be held together with at least one fastening member. Various other methods, systems, and computer-readable media are also disclosed.

12 Claims, 14 Drawing Sheets

FLUIDIC CONTROL: CLAMPED MEMBRANE STRUCTURE

BACKGROUND

Microfluidics systems are used in a variety of different applications. For example, microfluidics systems may be implemented in inkjet printheads, fuel cells, biochips and other devices. Microfluidics devices are typically created using a lost wax casting process combined with a lining and bonding of silicone parts. This conventional process begins by creating wax molds of desired empty spaces. Once the wax molds are created, silicone is poured around the wax molds. After the silicone cures, the wax is melted out of the cured silicone. The resulting silicone parts are then fastened together. Other methods of manufacturing microfluidic devices may include soft lithography, microelectromechanical machines (MEMS) manufacturing, etching from a solid piece of material, or molding multiple pieces of silicone and then aligning and stacking them. None of these traditional processes scale well, however, and as such, production of microfluidics devices in large numbers may be time and cost prohibitive.

SUMMARY

As will be described in greater detail below, the instant disclosure describes an improved method for manufacturing microfluidics systems that is both highly scalable and potentially more cost efficient than previous methods.

In one example, a method of manufacturing a microfluidic control valve may include positioning a membrane on top of a channeled layer. The channeled layer may include a shim portion that may be dimensioned to limit the amount of compression appliable to the membrane. The membrane may be positioned at a juncture in the channeled layer. The method may next include positioning a transmission housing layer over the membrane and the channeled layer. The method may also include fastening the channeled layer, the membrane, and the transmission housing layer together. The channeled layer, the membrane, and the transmission housing layer may be held together with at least one fastening member.

In some examples, the shim portion may be a separate shim layer. In some examples, the method of manufacturing may further include producing a channeled layer that includes a source-to-drain channel that channels fluid from a source to a drain. The method of manufacturing may also include producing a gate channel that houses a transmission element configured to apply pressure to a membrane positioned at a juncture in the source-to-drain channel. The membrane may be configured to regulate fluid flow from the source to the drain. The method of manufacturing may further include producing a shim layer that is positioned on top of the channeled layer. The method of manufacturing may also include producing the membrane which is positioned at the juncture of the source-to-drain channel, and may include fastening the channeled layer, the shim layer and the membrane together with a fastening member.

In some examples, the method of manufacturing may further include producing an additional shim layer and an additional membrane. This second shim layer may limit the amount of compression that may be applied to the additional membrane.

In some examples, the microfluidic control valve may be a normally open valve. In some examples, increased pressure applied to the transmission element may increasingly stop fluid flow through the juncture between the source and the drain.

In some examples, the microfluidic control valve may be a normally closed valve. In such cases, the method of manufacturing may include producing a contact area connected to the gate channel which, upon receiving an input pressure, pushes up on the transmission element housed in the transmission housing layer, reversing the direction of motion when the gate is pressurized.

In some examples, the method of manufacturing may further include producing an exhaust channel in one of the device's layers including a transmission housing layer. The exhaust channel may be configured to prevent pressure buildup within the microfluidic control valve. In some examples, producing the channeled piece may include milling or molding the channeled piece. In some examples, the shim layer may be thinner than the membrane. In some examples, producing the shim layer that is dimensioned to limit the amount of compression that may be applied to the membrane may provide a specified compression ratio or compression range within the microfluidic control valve. In some examples, the source-to-drain and gate channels may be formed specific to a certain layout.

In addition, a corresponding apparatus may include a membrane that is positioned at a juncture in a channeled layer. The apparatus may also include the channeled layer which may include a shim portion that may be dimensioned to limit the amount of compression that may be applied to the membrane. The apparatus may also include a transmission housing layer that is positioned over the membrane and over the channeled layer. The apparatus may further include a fastening member that secures the channeled layer, the membrane, and the transmission housing layer.

In some examples, the apparatus may be a microfluidic control valve that is connected to various pieces of haptic feedback equipment. In some examples, the apparatus may further include an electronic controller configured to regulate fluid flow through the source-to-drain channel according to input signals received at the electronic controller. In some examples, the transmission housing layer, the membrane, and the channeled layer may be clamped together. In some examples, the transmission housing layer may include an exhaust port configured to channel exhaust pressure to an exhaust output.

In some examples, the channeled layer may include various internal pressure sensors embedded within the channeled layer. The internal pressure sensors may be configured to determine internal pressures at different locations within the system. In some examples, the channeled layer may include external pressure sensors configured to determine external pressures at various locations within the apparatus. In some examples, the apparatus may further include an electronic feedback component that receives electronic feedback that allows control of internal pressure at various locations within the apparatus.

In addition, a corresponding system may include a positioning module configured to position a membrane on top of a channeled layer. The channeled layer may include a shim portion that may be dimensioned to limit the amount of compression that may be applied to the membrane. The membrane may be positioned at a juncture in the channeled layer. The positioning module may also be configured to position a transmission housing layer over the membrane and the channeled layer. The system may also include a fastening module configured to fasten the channeled layer, the membrane, and the transmission housing layer. The channeled layer, the membrane, and the transmission housing layer may be held together with at least one fastening member.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
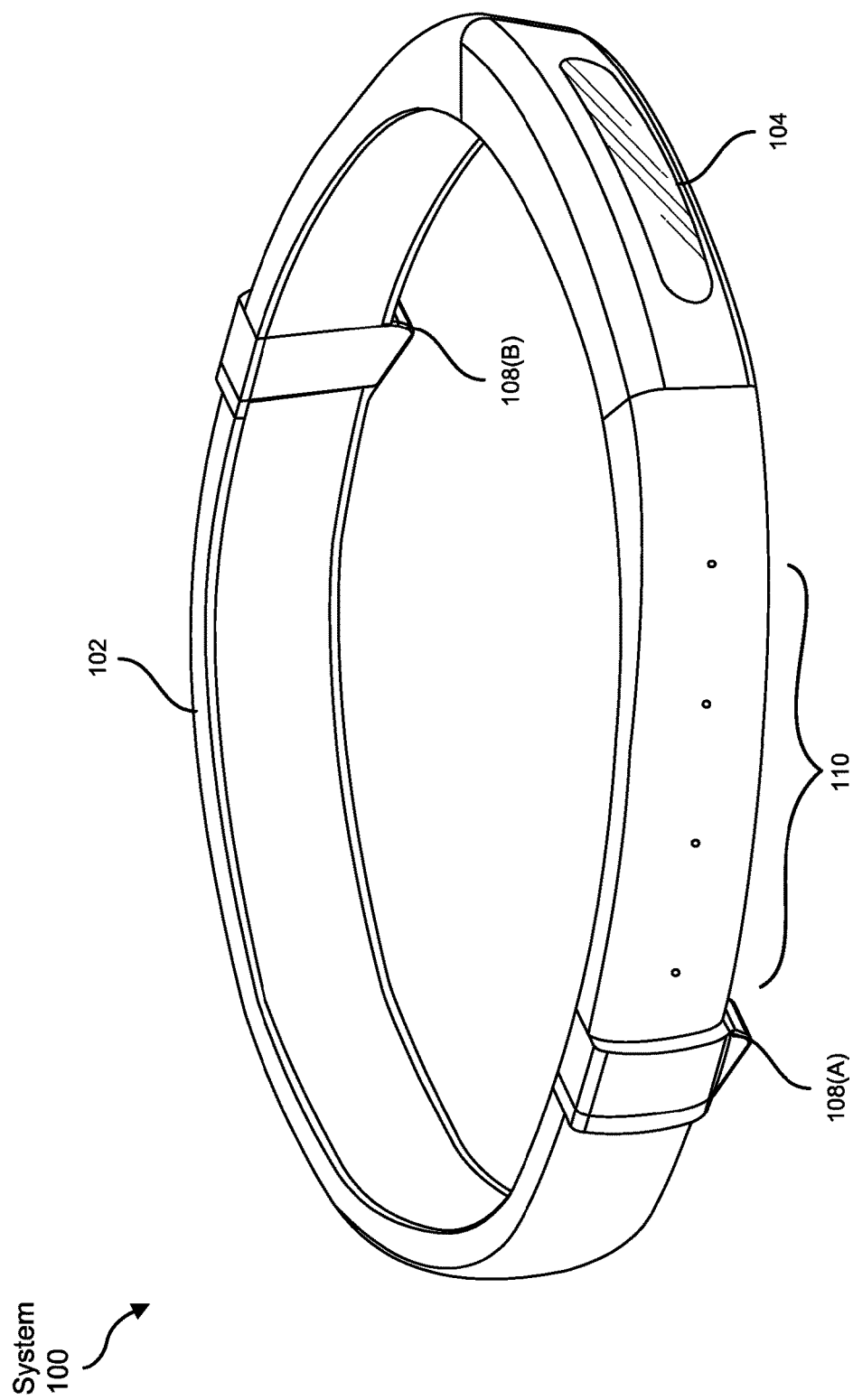
FIG. 1 illustrates an embodiment of an artificial reality headset.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to methods and systems for manufacturing microfluidic control valves. As will be explained in greater detail below, embodiments of the instant disclosure may be used to manufacture or produce substantially any type of microfluidic control valve including normally open valves, normally closed valves, 3-way or complimentary valves, or other types of valves. In some cases, these valves may be linked together to create complex chains of microfluidic control valves. Regardless of whether the valves are used alone or in combination with other valves, each microfluidic control valve may be manufactured using one or more of the methods described herein.

The following will provide, with reference to FIGS. 1-13, detailed descriptions of manufacturing systems and methods for implementing the same. The figures also provide examples of microfluidic control valves that can be manufactured using the embodiments described herein.

Many of the microfluidic control valves described herein may be implemented in haptics devices that are designed to provide haptic feedback. For example, many artificial reality system (e.g., augmented reality (AR), virtual reality (VR), etc.) may implement some type of haptic feedback devices such as actuators placed in gloves worn by a user. These haptic devices, however, may be placed in many different locations and on many different AR and VR devices including in headsets, neckbands, handheld controllers, footwear or other devices designed to provide a more immersive experience. Accordingly, examples of such AR and VR devices are presented briefly herein as context for potential implementations of the microfluidic control valves that may be produced using the embodiments described herein.

Artificial reality systems may be implemented in a variety of different form factors and configurations. Some artificial reality systems may be designed to work without near-eye displays (NEDs), an example of which is AR system 100 in FIG. 1. AR systems that work without NEDs may take a variety of forms, such as head bands, hats, hair bands, belts, watches, wrist bands, ankle bands, rings, neckbands, necklaces, chest bands, eyewear frames, and/or any other suitable type or form of apparatus. Other artificial reality systems may be designed to work with an NED that may provide visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. AR system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

Figure 2:
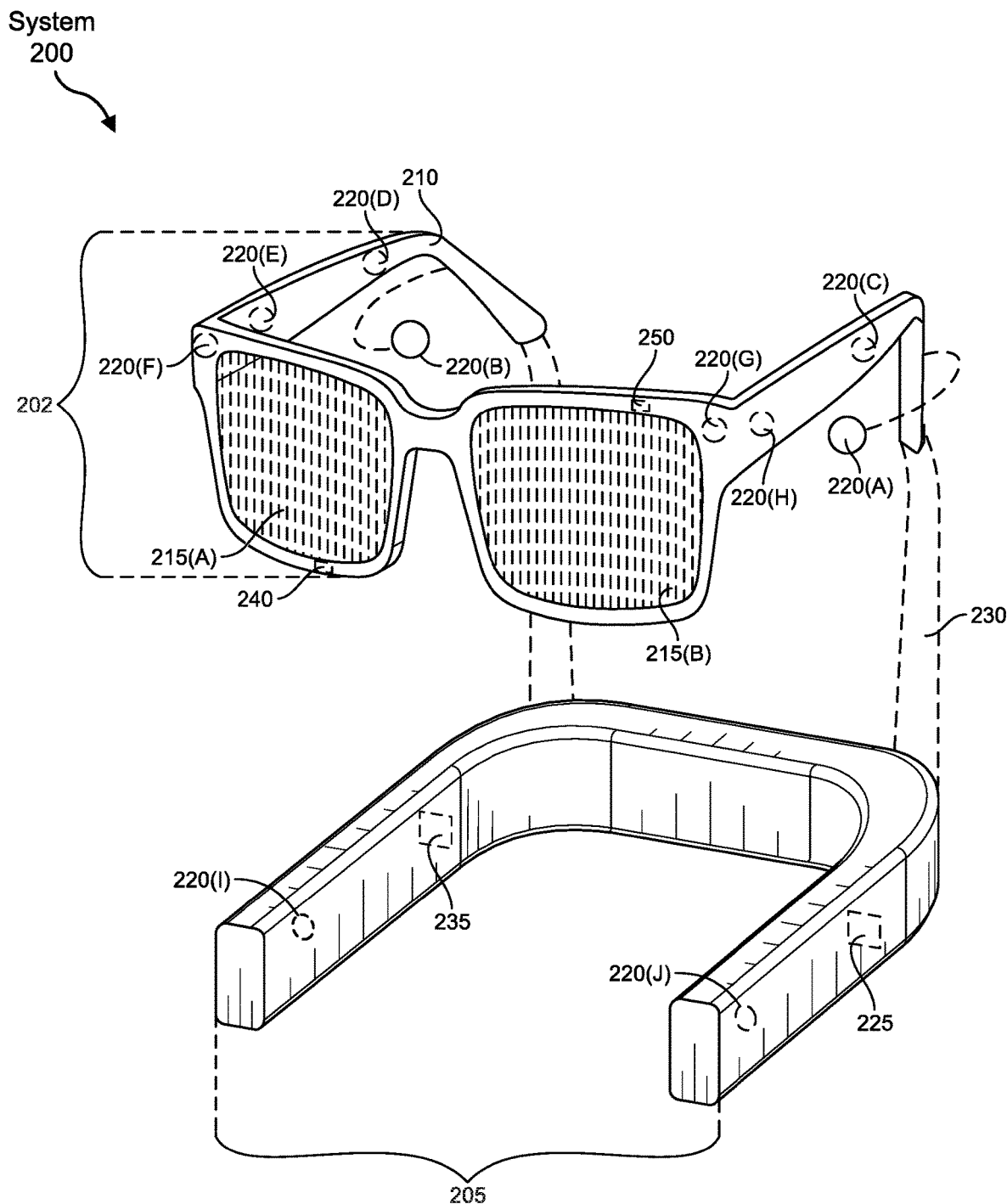
FIG. 2 illustrates an embodiment of an augmented reality headset and a corresponding neckband.

The embodiments discussed in this disclosure may also be implemented in AR systems that include one or more NEDs. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. Examples of sensor 240 may include, without limitation, accelerometers, gyroscopes, magnetometers, other suitable types of sensors that detect motion, sensors used for error correction of the IMU, or some combination thereof. AR system 200 may also include a microphone array with a plurality of acoustic sensors 220(A)-220(J), referred to collectively as acoustic sensors 220.

AR system 200 may further include or be connected to an external device. (e.g., a paired device), such as neckband 205. As shown, neckband 205 may be coupled to eyewear device 202 via one or more connectors 230. The connectors 230 may be wired or wireless connectors and may include electrical and/or non-electrical (e.g., structural) components. In some cases, the eyewear device 202 and the neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of the eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, gloves, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality. Neckband 205 may also include a controller 225 and a power source 235. Moreover, the neckband may include one or more transducers configured to provide haptic feedback to the user. The haptic feedback may include pulses, vibrations, buzzing or other sensations that communicate information to a user.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more inertial measurement units (IMUS), one or more tracking emitters or detectors, and/or any other suitable device or system for creating an artificial reality experience.

Figure 3:
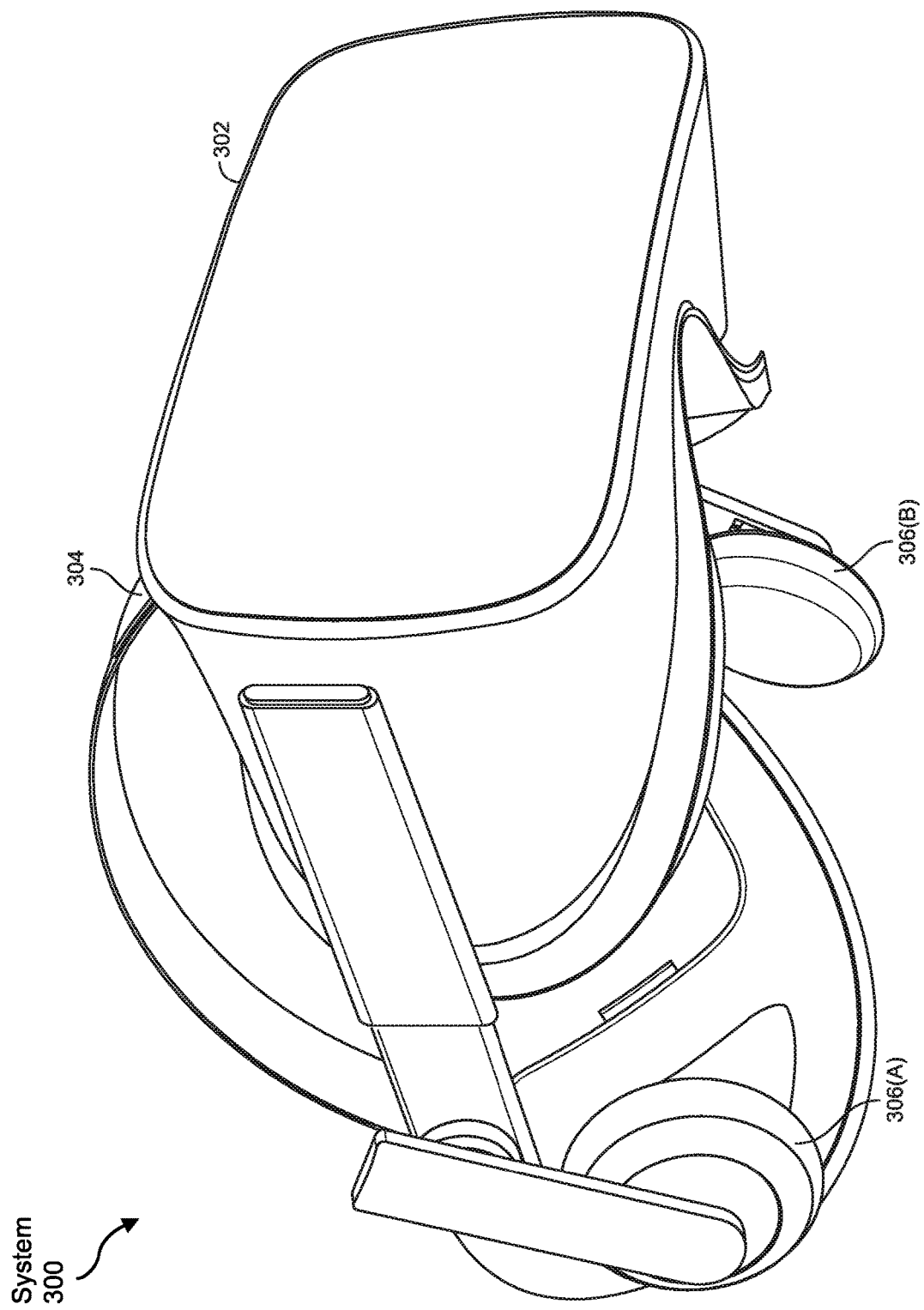
FIG. 3 illustrates an embodiment of a virtual reality headset.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Figure 4:
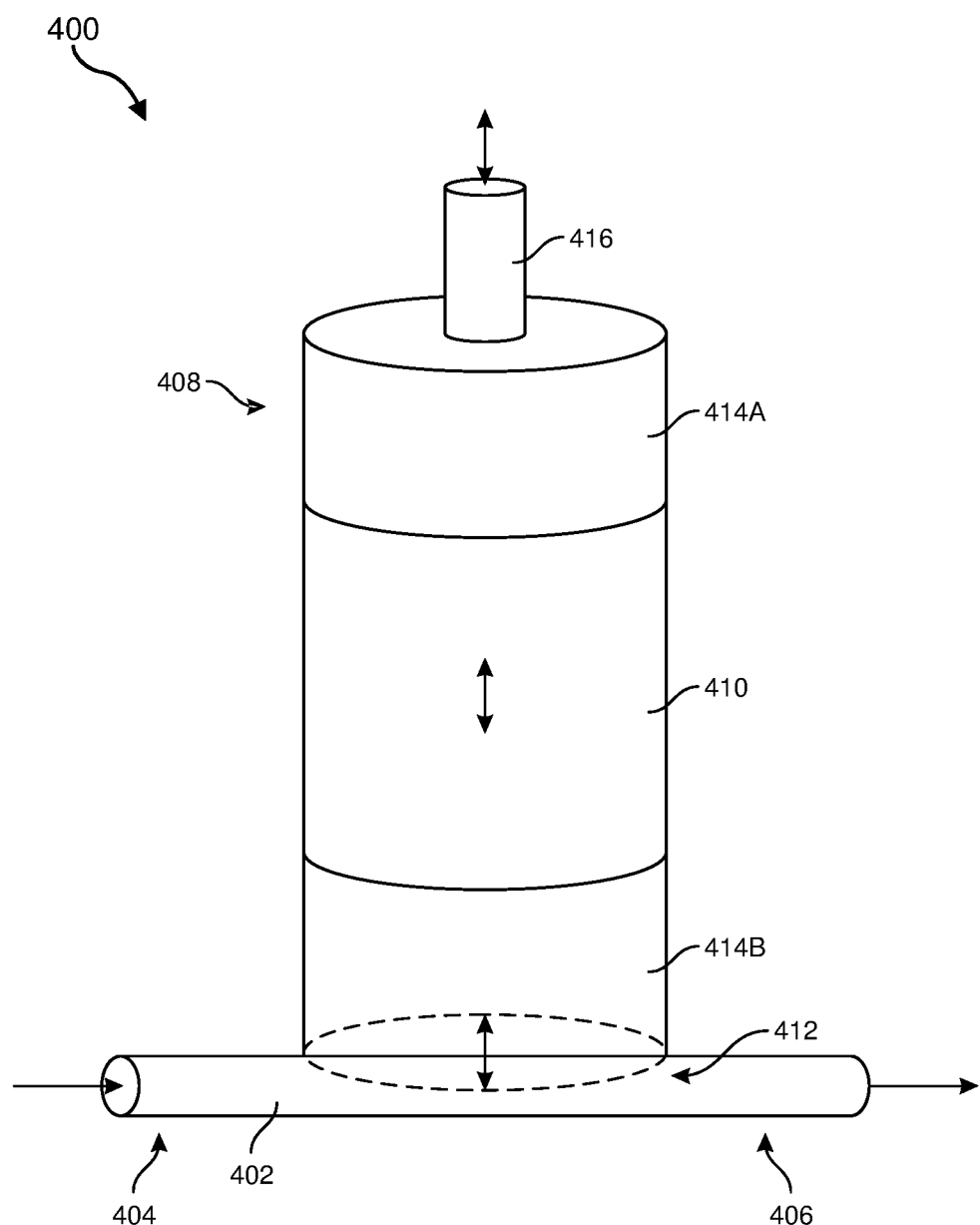
FIG. 4 illustrates a schematic diagram of a fluidic valve, according to at least one embodiment of the present disclosure.

The following will provide, with reference to FIGS. 4-13, detailed descriptions of how microfluidic control valves may be manufactured. FIG. 4, for example, may illustrate a fluidic system that involves the control (e.g., stopping, starting, restricting, increasing, etc.) of fluid flow through a fluid channel. The control of fluid flow may be accomplished with a fluidic valve. FIG. 4 shows a schematic diagram of a fluidic valve 400 for controlling flow through a fluid channel 402, according to at least one embodiment of the present disclosure. Fluid from a fluid source (e.g., a pressurized fluid source, a fluid pump, etc.) may flow through the fluid channel 402 from an inlet port 404 to an outlet port 406, which may be operably coupled to, for example, a fluid-driven mechanism, another fluid channel, or a fluid reservoir.

The fluidic valve 400 may include a gate 408 for controlling the fluid flow through the fluid channel 402. The gate 408 may include a gate transmission element 410, which may be a movable component that is configured to transmit an input force, pressure, or displacement to a restricting region 412 to restrict or stop flow through the fluid channel 402. Conversely, in some examples, application of a force, pressure, or displacement to the gate transmission element 410 may result in opening the restricting region 412 to allow or increase flow through the fluid channel 402. The force, pressure, or displacement applied to the gate transmission element 410 may be referred to as a gate force, gate pressure, or gate displacement. The gate transmission element 410 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 4, the gate 408 of the fluidic valve 400 may include one or more gate terminals, such as an input gate terminal 414A and an output gate terminal 414B (collectively referred to herein as "gate terminals 414") on opposing sides of the gate transmission element 410. The gate terminals 414 may be elements for applying a force (e.g., pressure) to the gate transmission element 410. By way of example, the gate terminals 414 may each be or include a fluid chamber adjacent to the gate transmission element 410. Alternatively or additionally, one or more of the gate terminals 414 may include a solid component, such as a lever, screw, or piston, that is configured to apply a force to the gate transmission element 410.

In some examples, a gate port 416 may be in fluid communication with the input gate terminal 414A for applying a positive or negative fluid pressure within the input gate terminal 414A. A control fluid source (e.g., a pressurized fluid source, a fluid pump, etc.) may be in fluid communication with the gate port 416 to selectively pressurize and/or depressurize the input gate terminal 414A. In additional embodiments, a force or pressure may be applied at the input gate terminal 414A in other ways, such as with a piezoelectric element or an electromechanical actuator, etc.

In the embodiment illustrated in FIG. 4, pressurization of the input gate terminal 414A may cause the gate transmission element 410 to be displaced toward the restricting region 412, resulting in a corresponding pressurization of the output gate terminal 414B. Pressurization of the output gate terminal 414B may, in turn, cause the restricting region 412 to partially or fully restrict to reduce or stop fluid flow through the fluid channel 402. Depressurization of the input gate terminal 414A may cause the gate transmission element 410 to be displaced away from the restricting region 412, resulting in a corresponding depressurization of the output gate terminal 414B. Depressurization of the output gate terminal 414B may, in turn, cause the restricting region 412 to partially or fully expand to allow or increase fluid flow through the fluid channel 402. Thus, the gate 408 of the fluidic valve 400 may be used to control fluid flow from the inlet port 404 to the outlet port 406 of the fluid channel 402.

Figure 5A:
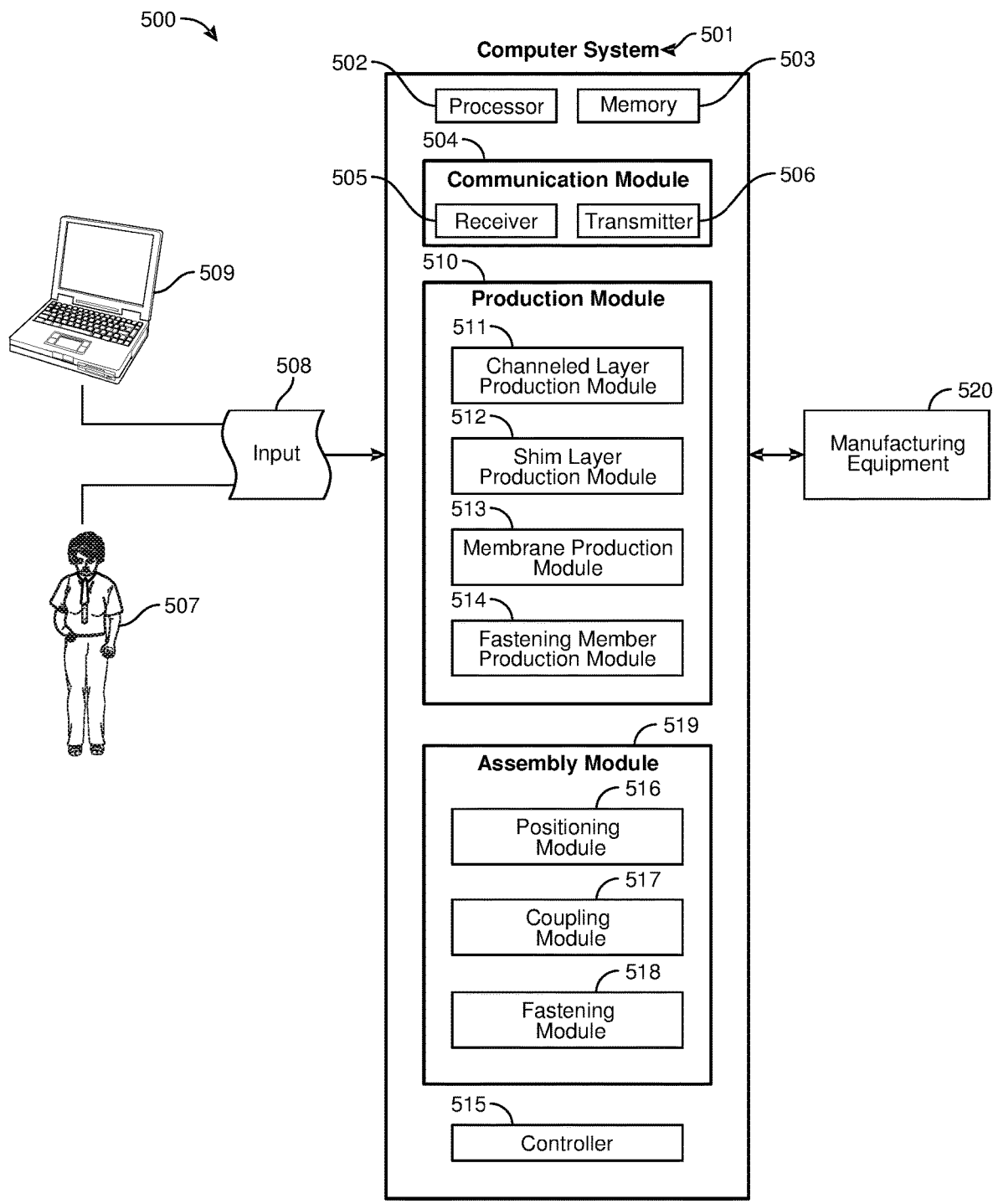
FIG. 5A illustrates a computing environment in which the embodiments herein may operate including manufacturing a microfluidic control valve.

FIG. 5A, for example, illustrates a computing architecture 500 in which many of the embodiments described herein may operate. The computing architecture 500 may include a computer system 501. Many of the manufacturing process steps may be performed under the control of a computer system. The computer system 501, for example, may include at least one processor 502 and at least some system memory 503. The computer system 501 may be any type of local or distributed computer system, including a cloud computer system, or a stand-alone embedded system such as a controller. The computer system 501 may include program modules for performing a variety of different functions. The program modules may be hardware-based, software-based, or may include a combination of hardware and software. Each program module may use or represent computing hardware and/or software to perform specified functions, including those described herein below.

For example, the computer system 501 may include a communications module 504 configured to communicate with other computer systems or controllers. The communications module 504 may include any wired or wireless communication means that can receive and/or transmit data to or from other computer systems. These communication means may include radios including, for example, a hardware-based receiver 505, a hardware-based transmitter 506, or a combined hardware-based transceiver capable of both receiving and transmitting data. The radios may be WIFI radios, cellular radios, Bluetooth radios, global positioning system (GPS) radios, or other types of radios. The communications module 504 may be configured to interact with databases, mobile computing devices (such as mobile phones or tablets), embedded systems, or other types of computing devices.

The computer system 501 may also include other modules including production modules 510. Production module 510 may include substantially any number of hardware or software modules configured to control a production process. Each production module may be designed to control a certain aspect of production or may control production of a certain layer or part of a microfluidic control valve. For instance, the channeled layer production module 511 may be configured to use manufacturing equipment 520 to manufacture a channeled layer that includes a source-to-drain channel that channels fluid from a source to a drain. The channeled layer production module 511 may also produce a transmission housing layer that houses a transmission element configured to press on a membrane positioned at a juncture in the source-to-drain channel. The shim layer production module 512 may be configured to use or instruct manufacturing equipment 520 to produce a shim layer that is positioned on top of the channeled layer. Still further, a membrane production module 513 may be configured to use the manufacturing equipment 520 to produce a membrane that is positioned at the juncture of the source-to-drain channel. The fastening member production module 514 may control production of fastening members which fasten the channeled layer, the shim layer and the membrane together.

It should be noted that the manufacturing equipment 520 of FIG. 5A may include a single piece of equipment or multiple different pieces of manufacturing equipment. The manufacturing equipment 520 may all be located at the same facility or may be located across different facilities in different physical locations. In some cases, the same piece of manufacturing equipment may be used to produce multiple pieces of a microfluidic control valve (e.g., a channeled layer, a shim layer, a membrane and/or a fastener) and in other cases, different pieces of manufacturing equipment 520 may be used to produce different microfluidic control valve pieces. Accordingly, while production modules 510 may be located on a single computer system, they may control different pieces of manufacturing equipment located in different locations.

Moreover, the microfluidic control valves described herein may be produced and assembled in the same location or in different locations. For instance, an assembly module 519 may be configured to take channeled layers, shim layers, membranes, transmission housing layers, or other layers that were previously manufactured (e.g., using manufacturing equipment 520 or using manufacturing equipment at another location), couple them together (e.g., using coupling module 517) and then fasten them together using a fastening member. The coupling and fastening may be performed independent of the production process used to produce the channeled layers, shim layers, membranes, transmission housing layers, or other layers (as controlled by production module 510). Accordingly, assembly module 519 may include a positioning module 516 that may be configured to position a membrane on top of a channeled layer. The membrane may be positioned at a juncture in the channeled layer. The positioning module 516 may also position a transmission housing layer over the membrane and the channeled layer.

Furthermore, the assembly module 519 may include a fastening module 518 that may be configured to fasten the channeled layer, the shim layer, the membrane, and the transmission housing layer together with a fastening member.

Still further, it will be understood that the computer system 501 may include a separate controller 515 or may itself be a controller. The controller 515 may be a hardware or firmware device, for example, such as an application-specific integrated circuit (ASIC), a field-programmable gate array (FPGA), or similar device. Each production module 510 or assembly module 519 may be configured to communicate with the manufacturing equipment 520 over a wired or wireless connection through the communications module 504. Each production module 510 may be part of the same hardware device or may be on different hardware devices. These modules will be described further below with regard to method 550 of FIG. 5B.

Figure 5B:
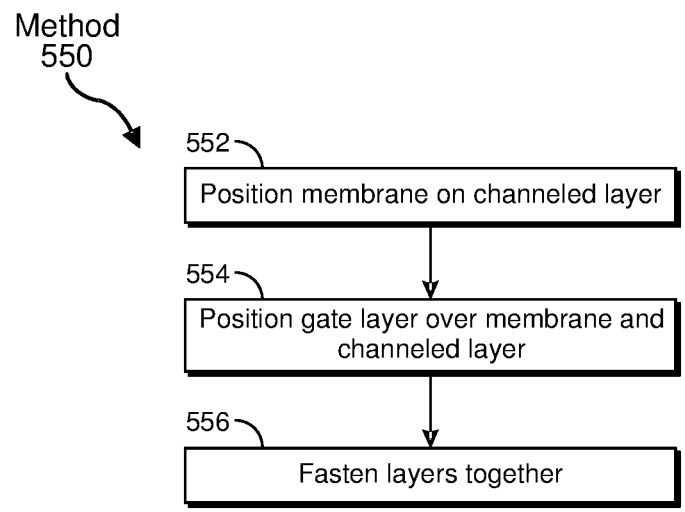
FIG. 5B illustrates a flow diagram of an exemplary method for manufacturing a microfluidic control valve.

FIG. 5B illustrates a flow diagram of an exemplary computer-implemented method 550 for manufacturing a microfluidic control valve. The steps shown in FIG. 5B may be performed by any suitable computer-executable code and/or computing system, including the system 501 and/or controller 515 of FIG. 5A. In one example, each of the steps shown in FIG. 5B may represent an algorithm whose structure includes and/or is represented by multiple sub-steps, examples of which will be provided in greater detail below.

As illustrated in method 550 of FIG. 5B, one or more of the systems described herein may manufacture a microfluidic control valve. For example, at step 552, the positioning module 516 may position a membrane (e.g., 604 of FIG. 7) on top of a channeled layer (e.g., 601 of FIG. 6). The membrane 604 may be positioned at a juncture (e.g., 613 of FIG. 7) in the channeled layer 601. The channeled layer 601 may include channels designed to conduct fluid. These channels may include source channels, drain channels, gate channels, exhaust channels, or other types of channels. As used herein, the term "fluid" may refer to liquids, gases (including air) or any other materials that can be transported through a channel. The channeled layer 601, as well as any of the other layers described herein, may be made out of a variety of different materials including milled acrylics, plastic (including 3D-printed plastics), silicone, aluminum, stainless steel or other metal, or other materials or combinations of materials.

At step 554 of method 550, the positioning module 516 of FIG. 5A may position a transmission housing layer (e.g., 603) over the membrane 604 and the channeled layer 601. The transmission housing layer 603 may include various components that are the same as or similar to those identified in FIG. 4 including a gate 408, a gate port 416, input and output gate terminals 414A/414B, and a transmission element 410. As such, any references herein to the term "transmission housing layer" may optionally include a gate, a gate port, input and output gate terminals and/or a transmission element. The channeled layer 601 may include a shim portion that may be dimensioned to limit the amount of compression that may be applied to the membrane 604. In some cases, the shim portion may be a separate shim layer 602 that may be added or removed, and in other cases, the shim portion may be molded into or otherwise part of the channeled layer 601 or the transmission housing layer 603. The shim layer 602 may be made out of metal, ceramic, acrylic or other rigid or semi-rigid material. The shim layer 602 may be stamped or laser cut, for example, from a sheet of material, or may be molded as a separate piece or molded into the channeled layer or transmission housing layer.

Figure 6:
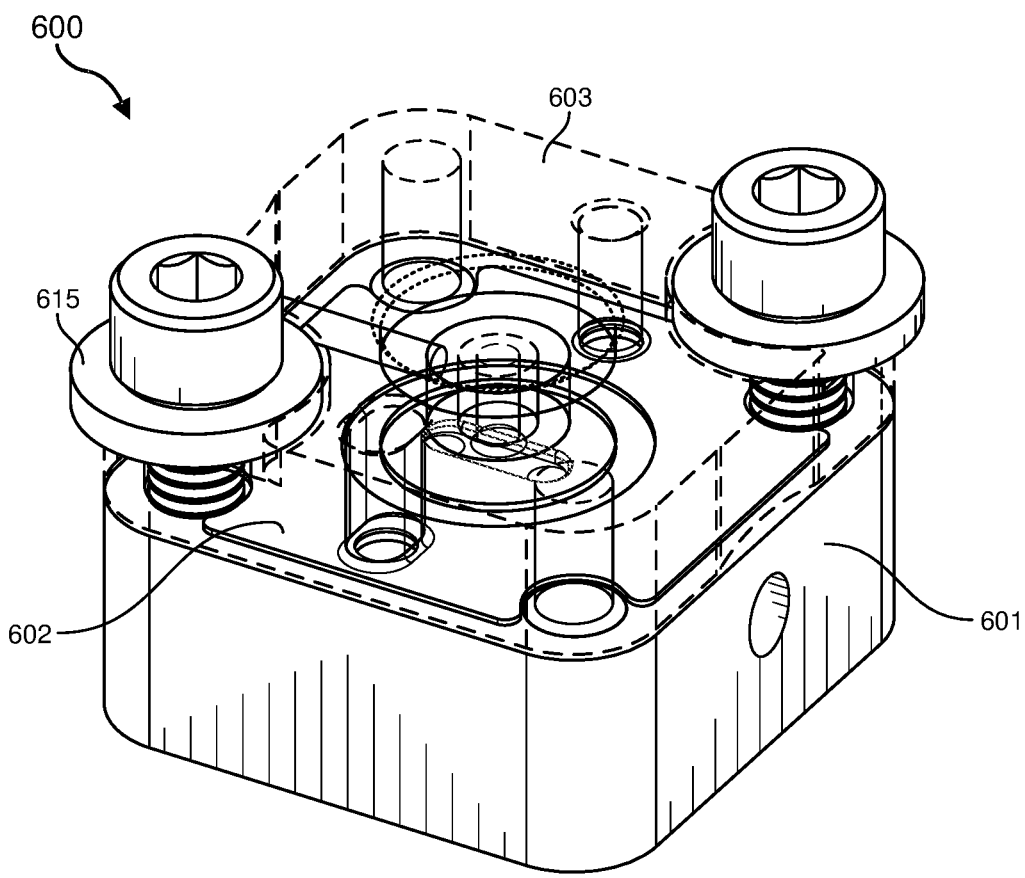
FIG. 6 illustrates an embodiment of a microfluidic control valve.

At step 556, the fastening module 518 of FIG. 5A may fasten the channeled layer 601, the membrane 604, and the transmission housing layer 603 together with at least one fastening member (e.g., 615 of FIG. 6). In some cases, the various layers of the microfluidic control valve (e.g., 601-603) may be clamped together using a power press or other similar piece of manufacturing equipment. In other cases, the layers 601-603 may be clamped together using screws or other fasteners 615. In some embodiments, the microfluidic control valve 600 may include rigid or semi-rigid outer layers (e.g., channeled layer 601 and transmission housing layer 603) and a soft, pliant membrane inner layer. A semi-rigid shim layer 602 may also be included between the outer layers to prevent the pliant membrane 604 from being overly compressed during the clamping process. In other embodiments, instead of or in addition to clamping, the membrane may be overmolded onto the rigid outer layers or may be bonded with a glue or solvent. By using such mechanical or chemical methods of bonding the membrane in addition to clamping, the microfluidic control valve may stay held together longer and may perform more consistently overtime. Moreover, microfluidic control valves produced using overmolding and/or glue in addition to clamping may see a longer lifespan than those produced using clamping or bonding alone.

As noted above, production and assembly may occur in the same manufacturing facility or in different facilities. Each of the layers of the microfluidic control valve 600 may be produced, for example, using manufacturing equipment 520. The channeled layer production module 511 of FIG. 5A may produce channeled layer 601, for example. The channeled layer 601 may include one or more channels that lead from one location to another. In some cases, the channels may lead from a source to a drain. For instance, the channel 607 of FIG. 7 may be a source channel, a drain channel or a source-to-drain channel, depending on the configuration. Microfluidic control valves may be manufactured and assembled to have substantially any number of channels, including source channels, drain channels, gate channels, exhaust channels or other types of channels. The channels of one microfluidic control valve may lead to one or more channels in other microfluidic control valves or may lead to a series of control valves. As such, the microfluidic control valves may be linked together in chains to form networks of interconnected control valves.

In some embodiments, the computer system 501 may cause the production of a transmission housing layer (e.g., 603 of FIG. 6) that includes a gate (e.g., 408 of FIG. 4 or 609 of FIG. 8) with a transmission element configured to press on a membrane positioned at a juncture in the source-to-drain channel. The channeled layer production module 511 of computer system 501, for example, may communicate with manufacturing equipment 520 to produce a transmission housing layer 603. The transmission housing layer 603, like the channeled layer 601, may be made out of a variety of different materials including milled acrylics, plastics, silicone, aluminum, stainless steel or other metal, or other materials or combinations of materials. The transmission housing layer 603 may be machined, 3D printed, or may be constructed using lithography or etching. The transmission housing layer 603 may house a transmission element (e.g., 614 of FIG. 9). The transmission element 614 may be configured to press on a membrane 604 positioned at a juncture (e.g., 613 of FIG. 7) in the source-to-drain channel 607. The membrane 604 may be configured to regulate fluid flow from the source to the drain.

For example, when the transmission element 614 pushes on the membrane 604, the membrane will push down into the juncture 613 between the source and the drain. As the membrane 604 is pushed further down into the juncture 613, the membrane will block more and more of the fluid flow from the source to the drain. Once the membrane 604 is fully pushed into position over the juncture 613, each of the source and drain channels may be fully sealed, preventing any fluid flow from the source to the drain. Subsequently relieving pressure on the transmission element 614 by lowering the gate pressure in the gate channel may reduce pressure on the membrane 604, thereby unblocking the seal and allowing fluid to flow again. This process will be explained further below with regard to FIG. 9.

Figure 7:
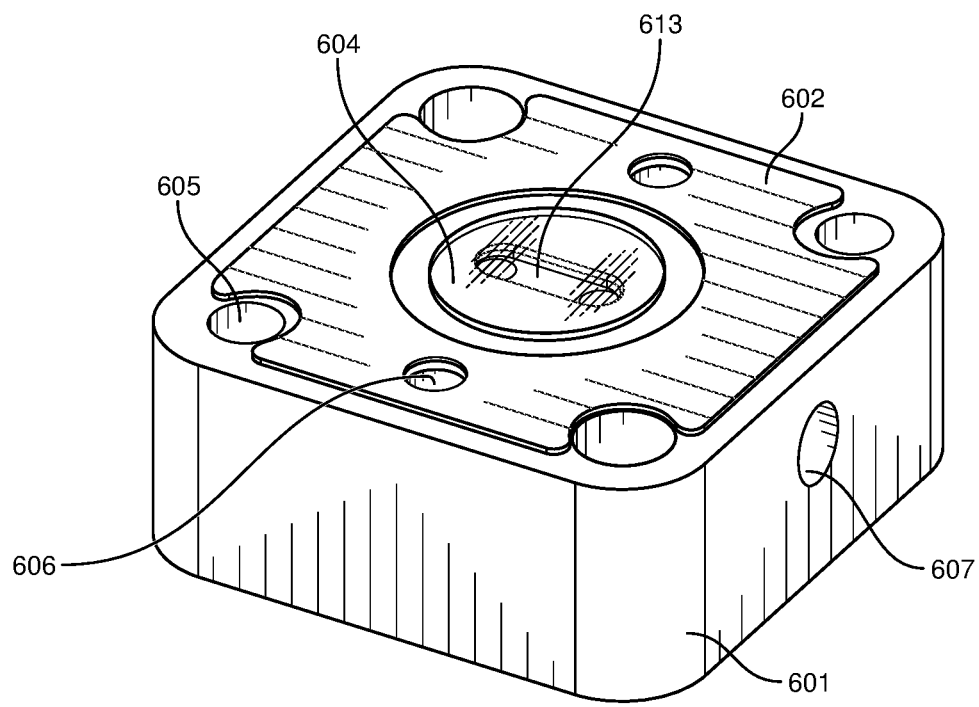
FIG. 7 illustrates a channeled portion of a microfluidic control valve including a shim layer.
Figure 9:
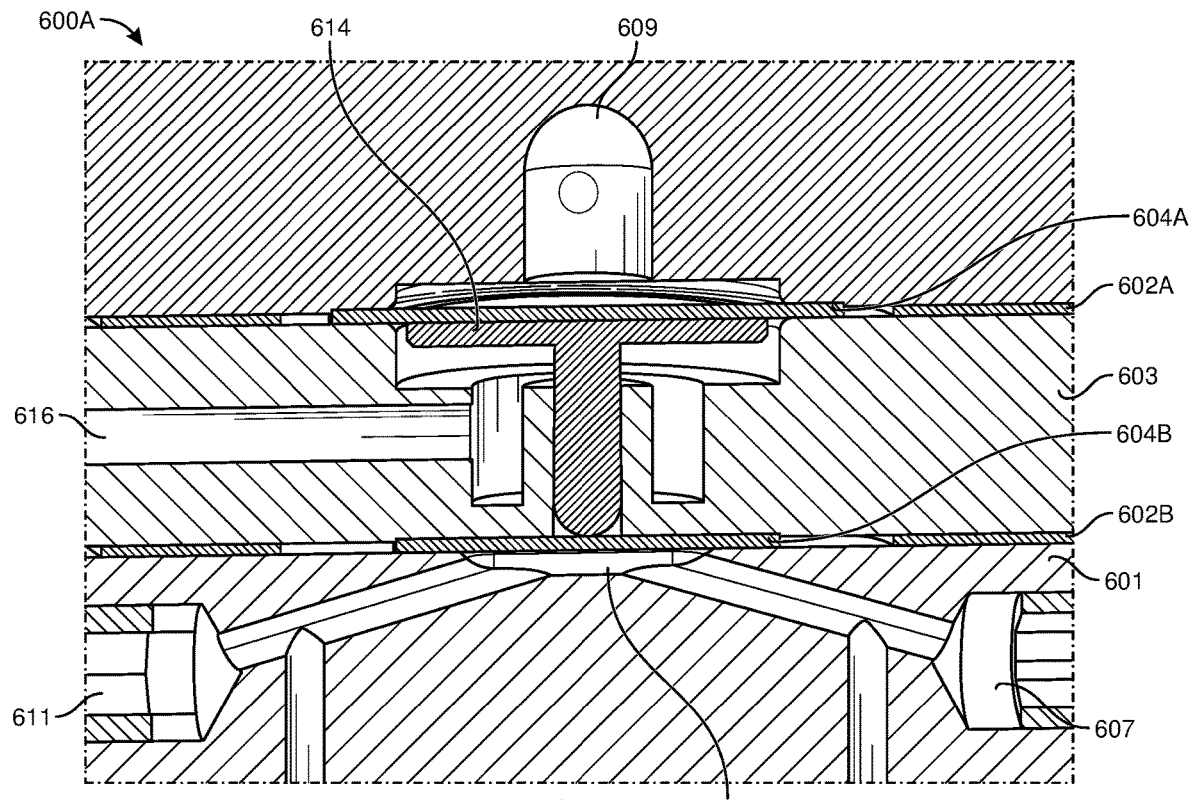
FIG. 9 illustrates an embodiment of a normally open microfluidic control valve.

In some embodiments, the shim layer production module 512 of computer system 501 may interact with one or more pieces of manufacturing equipment 520 to produce the shim layer (e.g., 602 of FIG. 6). The shim layer 602 may be dimensioned to limit the amount of compression that may be applied to the membrane 604. For instance, as shown in FIG. 7, the shim layer 602 may be relatively thin, but thick enough to prevent the membrane from compressing beyond a specified limit. Indeed, as shown in FIG. 9, the membrane 604B may be pressed into the juncture 613 but may be limited by the shim layer 602B. The shim layer may be constructed of a rigid or semi-rigid material such as steel or plastic. As such, when the transmission element 614 is pressed into the membrane 613B, the shim layer may hold the membrane in place and create a seal at the juncture 613.

In some embodiments, the membrane production module 513 of FIG. 5A may cause manufacturing equipment 520 to produce the membrane 604 which is positioned at juncture 613 of FIG. 9. The membrane may be made out of any type of soft, pliant material including silicone, plastic, or other material. The membrane 604 may be manufactured in a sheet of material, and then stamped or laser cut from that sheet. In some embodiments, the microfluidic control valve may include a single membrane, while in other embodiments, the microfluidic control valve may include multiple membranes. For instance, as shown in FIG. 9, the microfluidic control valve 600A may include membranes 604A and 604B.

Once each of the layers has been produced, the fastening member production module 514 may implement the manufacturing equipment 520 to produce various fastening members 615 which may be used to fasten the channeling layer, the transmission housing layer, the membrane, and/or the shim layer together. The manufacturing equipment 520 may use any of a variety of techniques for manufacturing each individual layer and for fastening the various layers together. In some cases, for example, each layer may be milled from a solid piece of material or may be molded into a solid piece that includes cavities for components and channels. Individually milling or molding the pieces may allow the pieces to be produced quickly and efficiently on a large scale. The layers may then be fastened together using adhesives such as glue or epoxy, fasteners such as screws or clips, or other mechanical means of holding the layers in place. In some cases, as noted above, the layers may be clamped together by a power press or other type of manufacturing equipment 520.

In some embodiments, a microfluidic control valve may be manufactured by machining each of the internal components and then clamping them together. In such embodiments, the soft membranes 604A and 604B may be positioned between the internal components before clamping them together. In some cases, additional top and bottom layers may be applied as reinforcing or cap layers. These reinforcing cap layers may be made of steel or other rigid material. At least in some cases, the reinforcing layers may prevent the microfluidic control valve from flexing while the manufacturing equipment 520 clamps the layers together.

Figure 8:
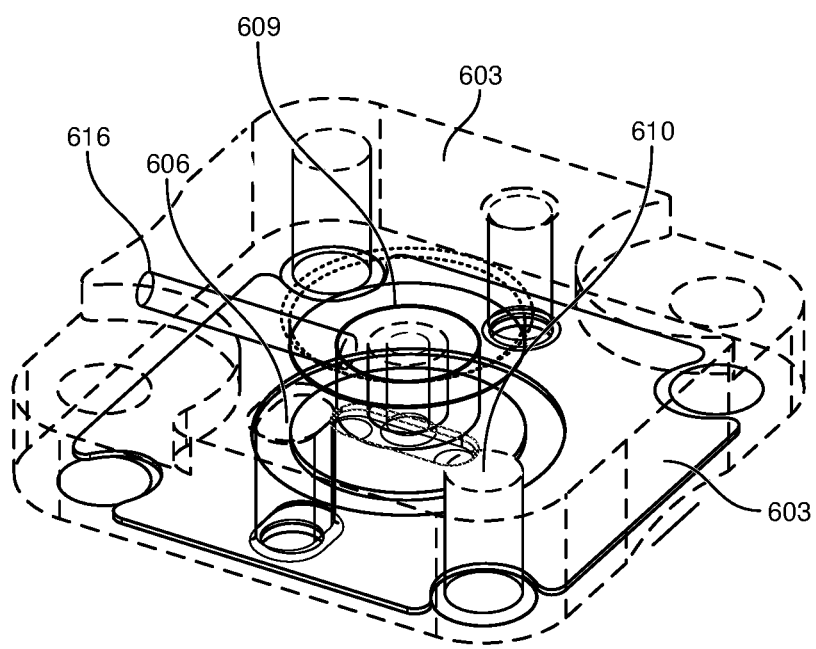
FIG. 8 illustrates a cap piece of a microfluidic control valve that fits on the channeled portion.
Figure 12A:
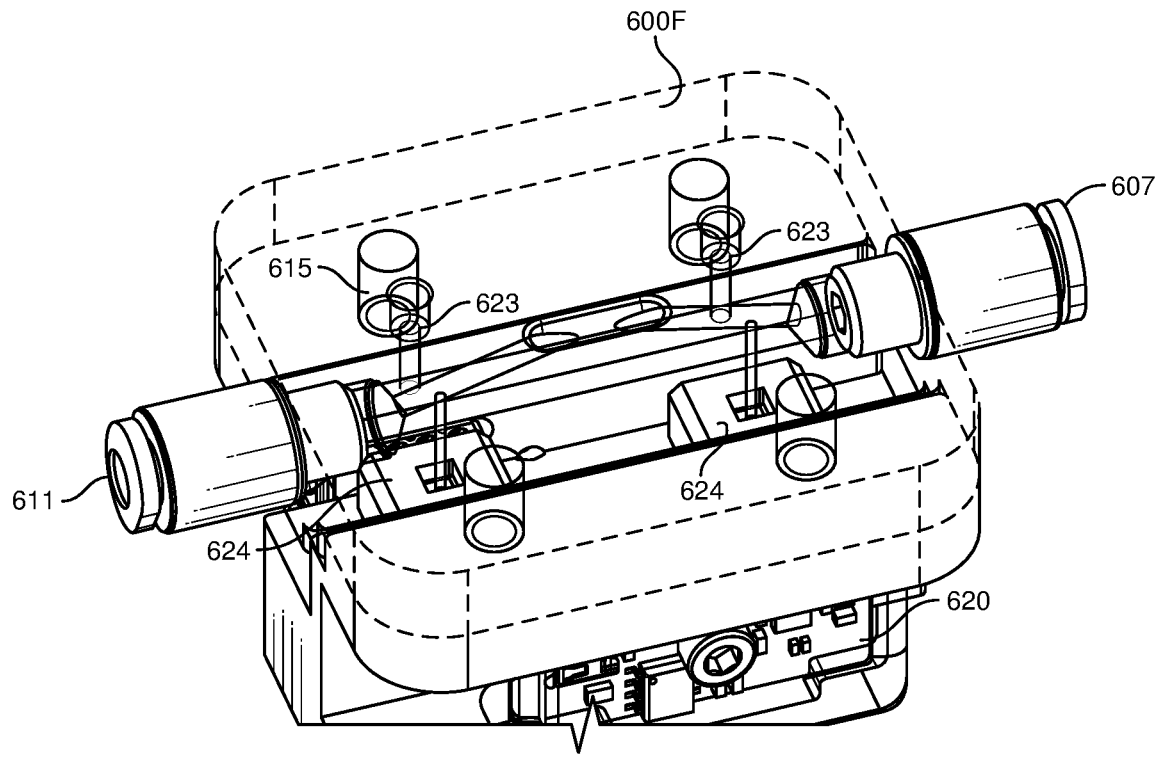
FIGS. 12A-12C illustrate various alternative embodiments of a microfluidic control valve.
Figure 12B:
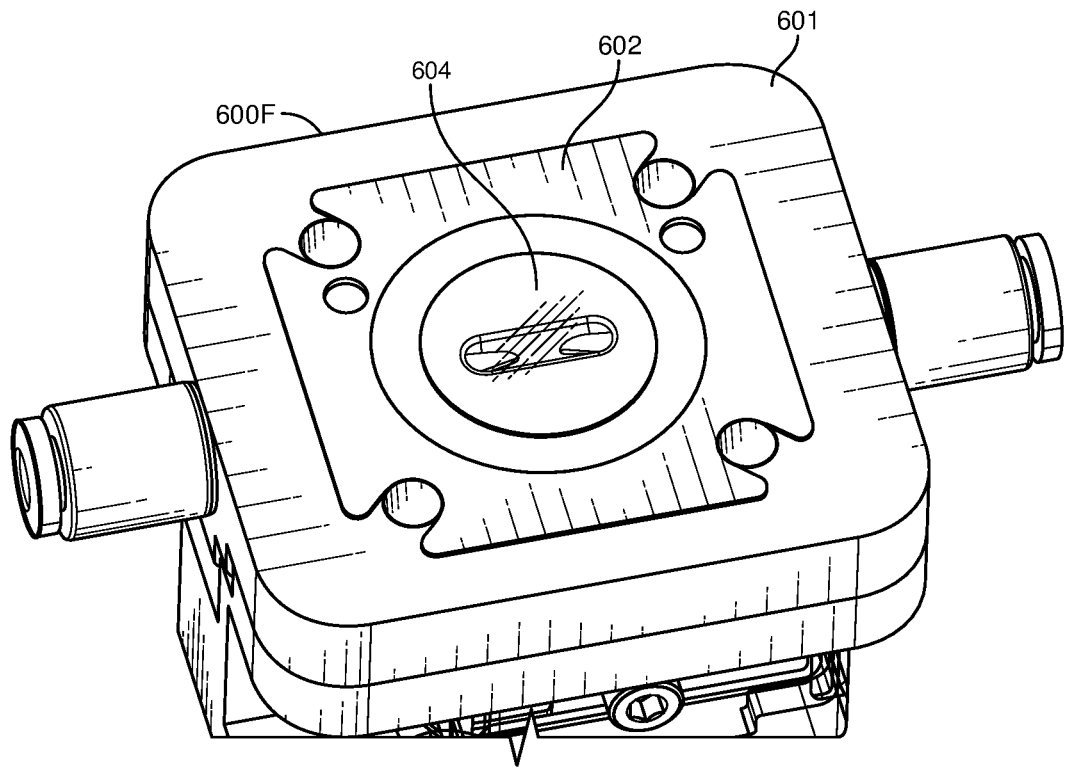
Figure 12C:
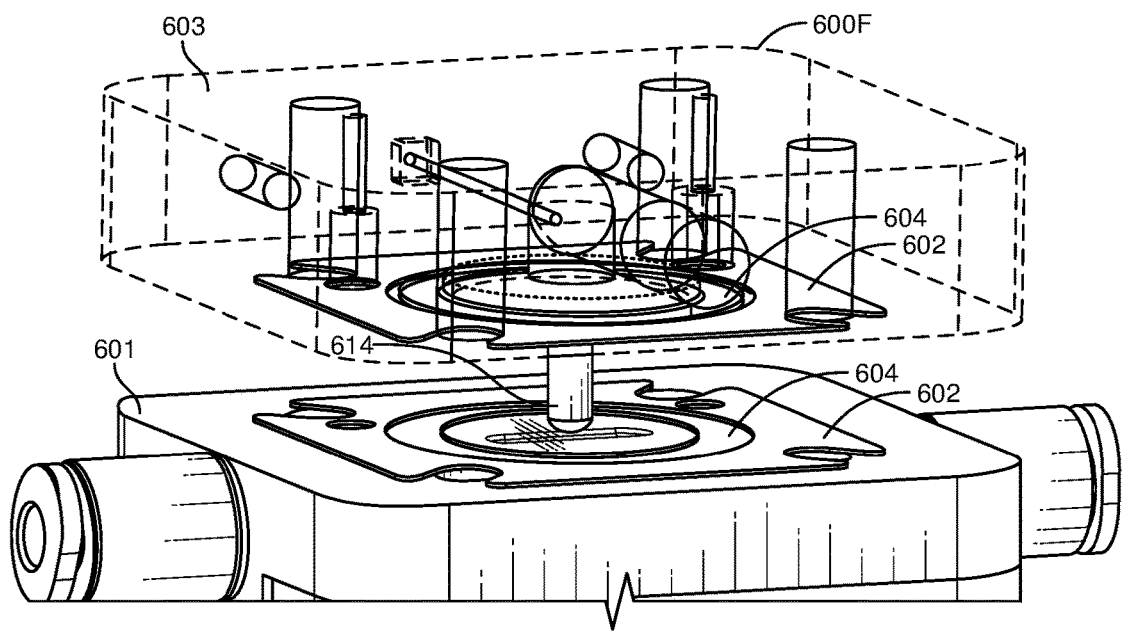

In some embodiments, the transmission housing layer 603 of FIG. 6 may be placed over the channeling layer 601. The shim layer 602 (which may include the membrane 604) may be clamped in between layers 601 and 603. As illustrated in FIG. 8, the transmission housing layer 603 may provide a housing for the transmission element 614, as well as an exhaust channel 616. Channels 606 and 610 may be used to fasten the various layers together. The gate may include a transmission element such as piston 614 of FIG. 9. Various other ports and channels may also be included in transmission housing layer 603 including channels for internal pressure sensors and channels for external pressure sensors, as shown in FIGS. 12A-12C. Such internal and external pressure sensors may be implemented to detect a current internal pressure within the valve or an external pressure outside the valve. Many other channels may be included in transmission housing layer 603 depending on design specifications. For instance, depending on design specifications, the microfluidic control valve 600 may include certain channels that allow the valve to be implemented in any of the artificial reality systems 100, 200 or 300 of FIG. 1, 2 or 3, respectively. The microfluidic control valve 600 may be implemented, for example, to provide controlled fluid flow to haptics modules that provide haptic feedback in artificial reality gloves, neckbands, headset or other artificial reality devices.

In some cases, the channeling, layers, materials, layout, and other features may be modified prior to manufacturing. For instance, users (e.g., 507 of FIG. 5A) may provide design specifications for a specific microfluidic control valve. The user 507 (or perhaps another computer system 509 or application) may provide input 508 indicating how the microfluidic control valve is to be manufactured, including which materials are to be used for each layer, which types of fasteners are to be used, which channels are to be included, and which type of valve is to be produced. Accordingly, users or other entities may have a great deal of control over how the microfluidic control valves are manufactured. Moreover, the manufacturing process may be modified during production using input 508. This input may then be applied by the processor 502 and/or the controller 515 of computer system 101.

In some embodiments, as mentioned earlier and as shown in FIG. 9, a microfluidic control valve 600A may include multiple layers and/or multiple membranes. For instance, the manufacturing equipment 520 of FIG. 5A may be used to produce a membrane 604B that is placed over a juncture 613 between source channel 611 and drain channel 607 (although it should be noted that, in some cases, 611 may be a drain channel and 607 may be a source channel, depending on configuration). The shim layer 602B may prevent the membrane from being overly compressed by the clamping force. The microfluidic control valve 600A may also include another membrane 604A which may be positioned over the transmission element 614. The membrane 613A may be placed on a shim layer 602A which may prevent the membrane 613A from being overly compressed by the clamping force. In this manner, fluid may flow between a source and a drain when the membranes are not being stretched by the transmission element, and fluid may stop flowing when the transmission element pushes the membrane against the open channel from source to drain (i.e., in juncture 613).

In some embodiments, the microfluidic control valve 600A may be a normally open valve. As such, in normal operation, the valve is open, allowing fluid to flow from the source 611 to the drain 607. To close the valve, pressure may be applied at the gate 609. This pressure moves the membrane 604A, pressing against the transmission element 614. The transmission element 614 may then be pressed in a direction orthogonal to the gate 609 (downward in FIG. 9). The transmission element 614 may then press against the membrane 604B, pushing it into the juncture 613. As the membrane 604B is pressed further and further into the juncture 613, the membrane 604B increasingly restricts fluid flow between the source 611 and the drain 607. Increasing pressure may be applied at the gate 609 until the transmission element 614 has fully pressed the membrane 604B into the juncture 613. At this point, the membrane 604B may fully seal the source channel 611 and the drain channel 607 such that no fluid is permitted to flow. Releasing input pressure at the gate 609 may then cause the transmission element 614 and the membranes 604A/604B to retract, thereby allowing fluid flow from source 611 to drain 607.

Figure 10:
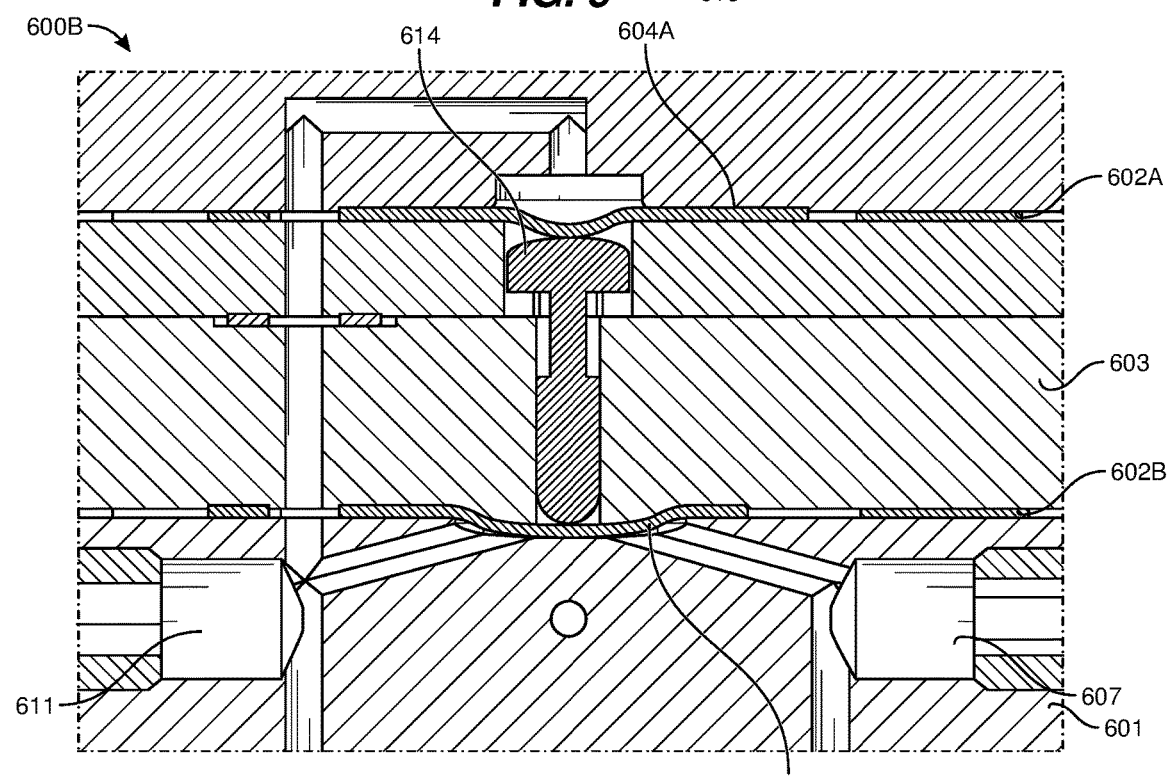
FIG. 10 illustrates an embodiment of a normally closed microfluidic control valve.

In some embodiments, as shown in FIG. 10, a microfluidic control valve 600B may be a normally closed valve. As such, during normal operation, the microfluidic control valve 600B may be in a close position that prevents fluid from flowing from the source 611 to the drain 607. The transmission element 614 is shown in an extended position, pushing down on the membrane 604B. In this position, the membrane 604B may prevent fluid from flowing from the source to the drain. In some cases, the transmission element 614 may be preloaded into this closed position via a preloaded input pressure at the gate, or via a spring, lever or other mechanical or electro-mechanical preloading mechanism. At least in some cases, the gate may be implemented as the pressure line that actuates the valve. As such, the preload pressure may be an extra line that comes from the source pressure (or other constant always-on pressure) to bias the transmission element to close the valve when the gate pressure is low. To overcome this preload force, an input pressure may be applied to a contact area connected to the gate. When the contact area receives an input pressure, the transmission element 614 may be raised from a closed position to an open position. Accordingly, one or more pieces of manufacturing equipment (e.g., 520 of FIG. 5A) may be used to manufacture the contact area and place the contact area within the gate of the microfluidic control valve 600B.

Figure 11A:
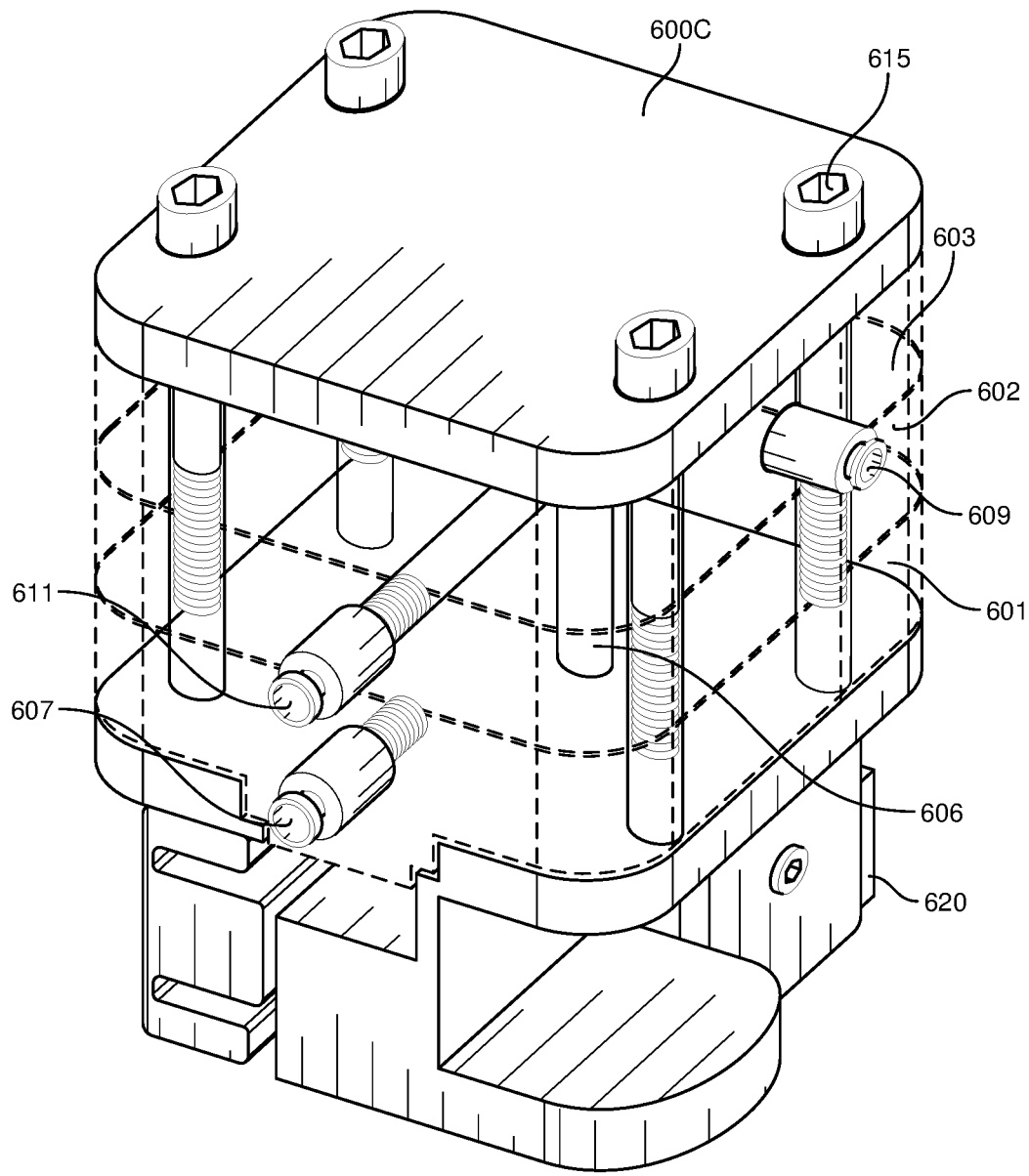
FIGS. 11A-11D illustrate various embodiments of a microfluidic control valve.

In some embodiments, the manufacturing equipment 520 may be further configured to produce an exhaust channel in at least one of the layers including the transmission housing layer 603, or the channeled layer 601. For example, as shown in FIGS. 8 and 9, the exhaust channel 616 may be configured to exhaust pressure from the microfluidic control valve 600/600A. In some cases, the pressure may be exhausted to the atmosphere and, in other case, the pressure may be exhausted to a pressurized exhaust area. The exhaust channel 616 may be formed in a variety of different manners, similar to the gate, drain and source channels. For example, the exhaust channel 616 may be produced by milling or molding the exhaust channel separately, or by milling or molding the channeled piece itself 601. In some embodiments, the exhaust channel, the source-to-drain channel and/or the gate channel may be formed specific to a certain layout. For example, as shown in FIG. 11A, a microfluidic control valve 600C may be manufactured in a certain form factor. The microfluidic control valve 600C may have a source channel 611, a drain channel 607, a gate channel 609 and an exhaust channel (not shown). It will be understood that the embodiment shown in FIG. 11 is merely one example of many different configurations. Indeed, any of the channels may be placed in different locations depending on how the device is to be used. Moreover, cavities for internal or external pressure sensors may be repositioned as needed and manufactured to accommodate a specific design.

As noted above, a corresponding apparatus (e.g., 600 of FIG. 6) may include a channeled layer (e.g., 601). A membrane may be positioned over the channeled layer 601, and a shim layer 602 may be positioned in substantially the same plane as the membrane, over the channeled layer 601. In some cases, the shim layer may be made of a different material than the channeled layer or, in other cases, may be made of the same material. The shim layer 602 may be made of a rigid or semi-rigid material that is dimensioned to prevent inner membranes from being overly compressed. The apparatus may also include a membrane 604 that is positioned at a juncture 613 in the channeled layer 601. The membrane may be made of a pliant material that is different than the channeled layer and/or the shim layer. The apparatus may also include a transmission housing layer 603 that provides a housing for a transmission element. The apparatus may optionally include rigid cap members below the channeled layer 601 and/or above the transmission housing layer 603.

As noted above with regard to FIG. 9, the microfluidic control valve 600A may be configured to receive fluids via source channel 611. As the fluids come in to the source channel 611, the fluids flow to a juncture 613 that is positioned between the source and the drain 607. When the membrane 604B is not depressed (as in FIG. 9), the fluids may travel freely through the juncture 613 and out through the drain 607. As pressure is applied at the gate 609, the transmission element 614 (e.g., a piston or a lever) may be pushed into the membrane 604B. As the transmission element 614 pushes further and further into the membrane 604B, the membrane 604B may seal off the juncture 613 from the source 611 and the drain 607. This prevents fluid flow from the source to the drain.

It should be noted that the distance traveled by the transmission element 614 may be very small, and that the transmission element may be pressed into a full-stop position or released into a full-open position very quickly. Intermediate positions where fluid flow is limited, but not fully on or off, may also be provided by making small adjustments to the amount of pressure applied by the transmission element. Any pressure holding the transmission element in place over the juncture 613 may be released back through the gate 609, causing the transmission element to return to its initial position. In some embodiments, port 616 may be implemented to prevent pressure from building up in the interior of the microfluidic control valve. As such, port 616 may act as a pressure equalizer, allowing pressure within the interior of the microfluidic control valve to escape to the external environment.

The apparatus 600 may further include one or more fastening member 615 that secure the channeled layer to the shim layer, the membrane, and the transmission housing layer. The fastening member 615 may include screws, bolts, clamps, clips or other fasteners. The fastening member may be tightened to a specified level of force, such that the layers are squeezed and held together by the fastener with the specified level of force. In some cases, a user may be able to adjust the level of force by tightening or loosening the fasteners.

In some embodiments, the microfluidic control valve 600, 600A, 600B or 600C may be connected to different pieces of haptic feedback equipment. The haptic feedback equipment may provide tactile feedback to users' hands, feet, arms, legs, head or may be embedded in full body artificial reality suits. These haptic feedback devices may implement microfluidic control valves to control when various actuators in the haptic feedback are active. Additionally or alternatively, the microfluidic control valves may be used to control which type of haptic feedback is provided, or may be used to control the level or intensity of haptic feedback. In some cases, the microfluidic control valves may include one or more electronic controllers that regulate fluid flow through the source-to-drain channel according to input signals received at the electronic controller. For instance, the microfluidic control valve (e.g., 600C of FIGS. 11A and 11B) may include an electronic controller 620 that may receive input signals from a user or other entity. The input signals may indicate how the microfluidic control valve is to operate, including how much to open or close the valve and when to open or close the valve.

In some embodiments, the controller 620 may receive sensor inputs from various internal pressure sensors (e.g., 606 of FIG. 7) embedded within the channeled layer 601. The internal pressure sensors 606, for example, may be configured to determine internal pressures at different locations within the microfluidic control valve 600. In some cases, the microfluidic control valve 600 may include external pressure sensors configured to determine external pressures at various locations in or around the valve. The controller 620 may also implement electronic feedback controls that allow the controller to regulate internal pressure at various locations within the microfluidic control valve. Thus, for example, the controller 620 may receive internal pressure measurements and/or external pressure measurements from the internal and external pressure sensors. The controller 620 may use these measurements as feedback to raise or lower the pressure in certain channels within the valve. As such, the controller may control how much pressure is placed on the membrane 604, for example, at any given time.

Figure 11B:
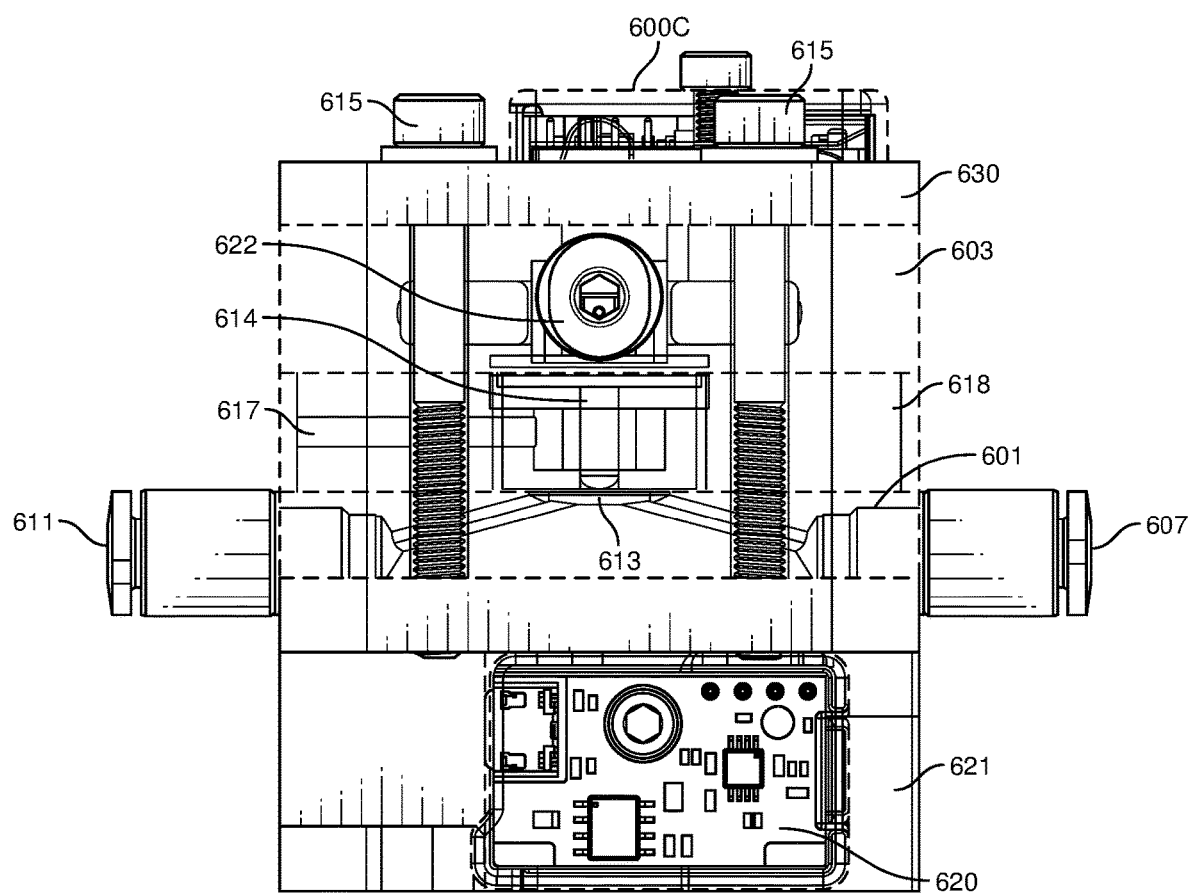

FIG. 11B illustrates a front view of an embodiment of a microfluidic control valve 600C that may include one or more built-in pressure sensors. As in FIG. 11A, the microfluidic control valve 600C may include multiple layers including a base layer (601), a middle layer (602) and a top layer 603. The microfluidic control valve 600C may also have a cap layer 630 and a sensor base 621. The sensor base 621 may hold one or more of the built-in pressure sensors. The pressure sensor board 620 may be used to communicate with the pressure sensors. Indeed, the pressure sensor board 620 may receive measurement data from the pressure sensors (e.g., 624 of FIG. 12A) indicating a current pressure at certain points within the microfluidic control valve. In some embodiments, the microfluidic control valve 600C may include vents to assist in regulating pressure including piston vent 617 that allows the piston 614 to vent excess pressure. The gate connection 622 may allow the microfluidic control valve 600C to be connected to other valves including, perhaps, valves 600D and/or 600E of FIGS. 11C and 11D, respectively.

Figure 11C:
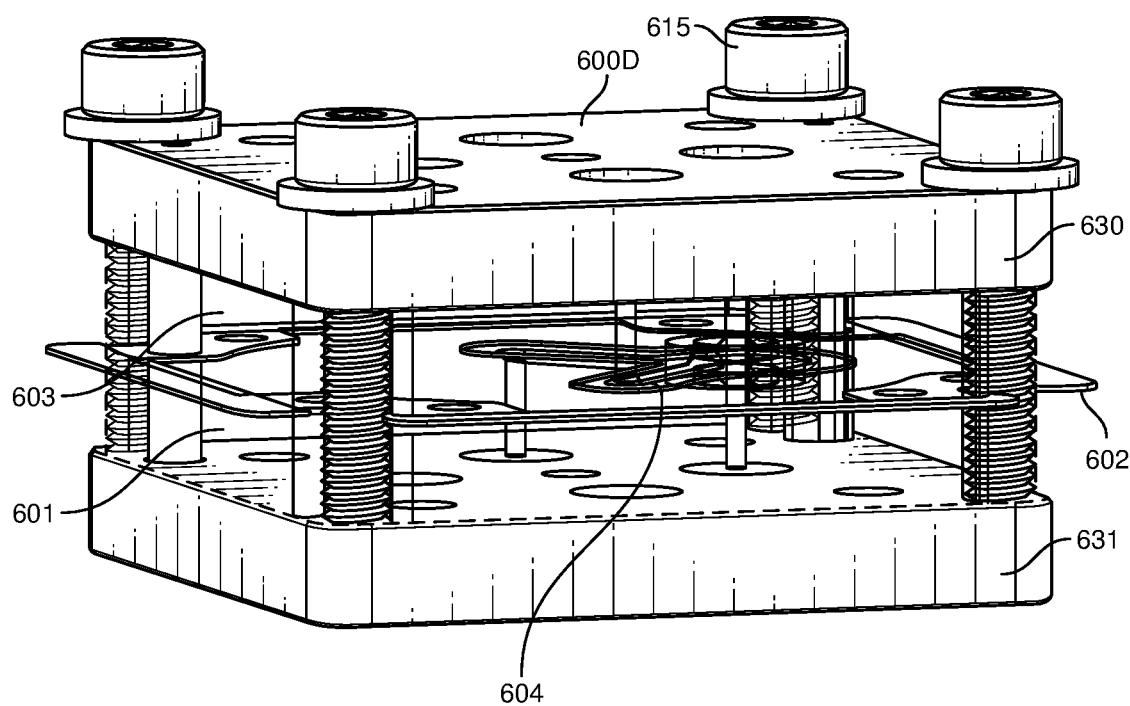
Figure 11D:
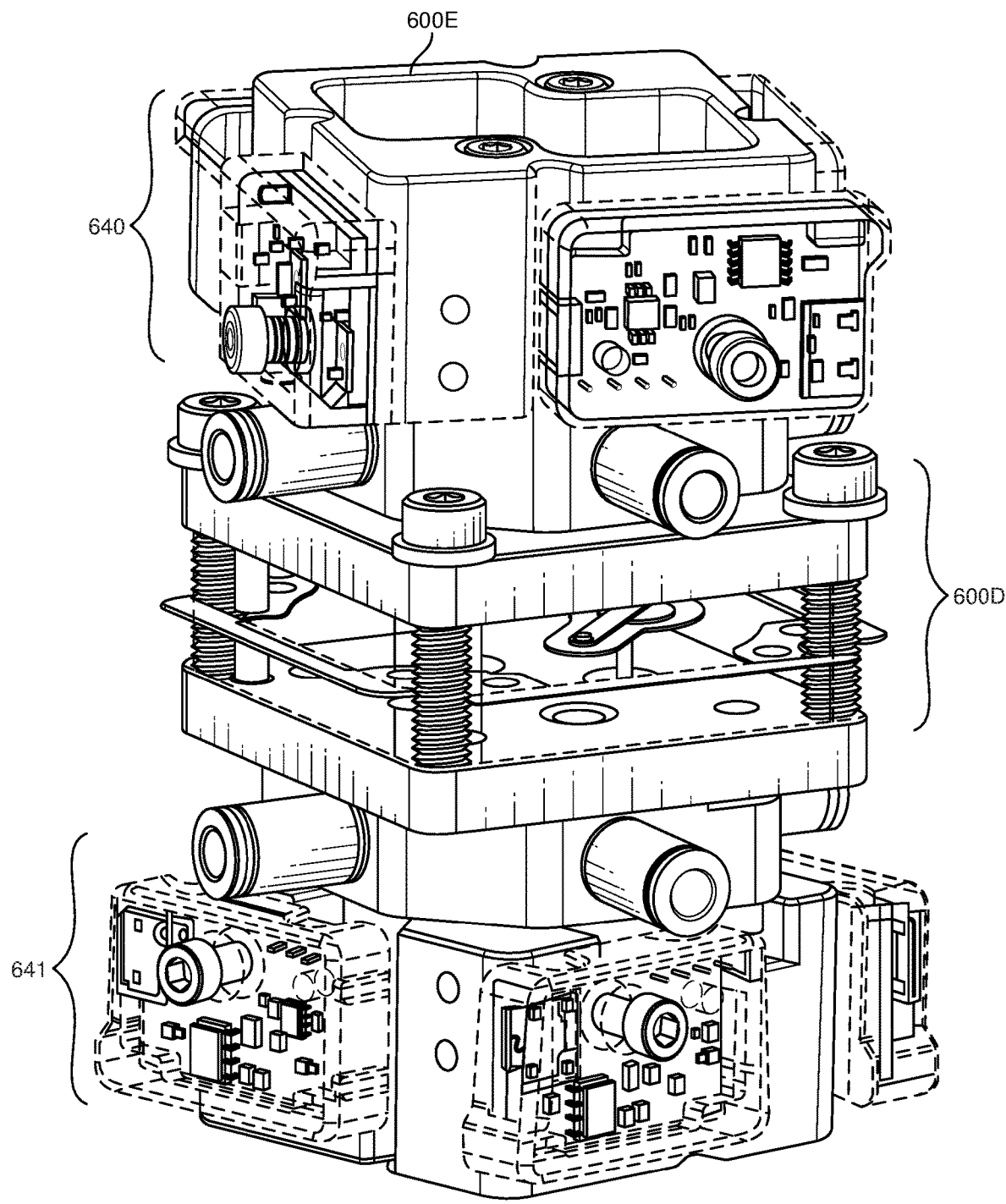

Microfluidic control valve 600D of FIG. 11C may include a reduced number of components. As illustrated, the microfluidic control valve 600D may include a base layer 601 (e.g., a channeled layer) and a top layer 603 (e.g., a transmission housing layer). The microfluidic control valve 600D may also include two rigid caps or plates 630 and 631 on the top and bottom, respectively, along with four screws 615 to provide a clamping force that holds the layers together. At least in some embodiments, the area between layer 601 and 603 may be where the membrane is actually clamped, limited by a shim layer 602. This embodiment may omit a middle layer or piston. The microfluidic control valve 600D may include a membrane in between a flow path in layer 601 and another flow path in layer 603. FIG. 11D illustrates an embodiment of a microfluidic control valve 600E which incorporates the microfluidic control valve 600D of FIG. 11C. Microfluidic control valve 600E may include tubing connections, pressure sensors, and other components (e.g., in 640 and 641), but those components may be moved to other sections. Each of these sections (e.g., 640, 600D, and 641) may be modular and may be implemented in many different types of microfluidic control valves.

FIG. 12A illustrates an embodiment of a microfluidic control valve 600F which shows one or more features in the base layer (e.g., channeled layer 601) without any membrane or shim. FIG. 12A illustrates pressure sensors 624, which may have fluid channels that intercept the flow path in order to get a pressure reading. Two holes for alignment pins 623 are also shown. In at least some embodiments, the various layers are to be aligned with each other. The alignment pin holes 623 may accommodate alignment pins which hold the layers in alignment. The alignment pins may be made of steel but may be made out of other rigid materials. In other cases, notches, protrusions, or other features may be molded into the layers to hold the layers in alignment. The screws 615, when threaded into the screw holes, may also be used to hold the layers in alignment.

FIG. 12B illustrates a base layer 601 with a shim 602 and membrane 604 on top. The middle layer 618 of FIG. 11B may then be placed on top of this shim 602 and membrane 604 to clamp the shim and membrane in between layer 601 and 603. FIG. 12 C illustrates the top layer 603 and the base layer 601 with the middle layer 618 removed. The middle layer may be configured to hold the piston 614 in place and may further provide a surface for both of the membranes 604 to be clamped against. In microfluidic control valve 600F, the middle layer may not have a fluid path. The piston vent 617 of FIG. 11B may be designed to keep the center area from having any pressure build up as the gate and or flow path are pressurized, since the motion of those membranes may add a certain amount of pressure to the middle layer if the vent is not present. At least in some embodiments, the vent 617 may be optional and, as such, some clamped designs may not use a vent.

Figure 13:
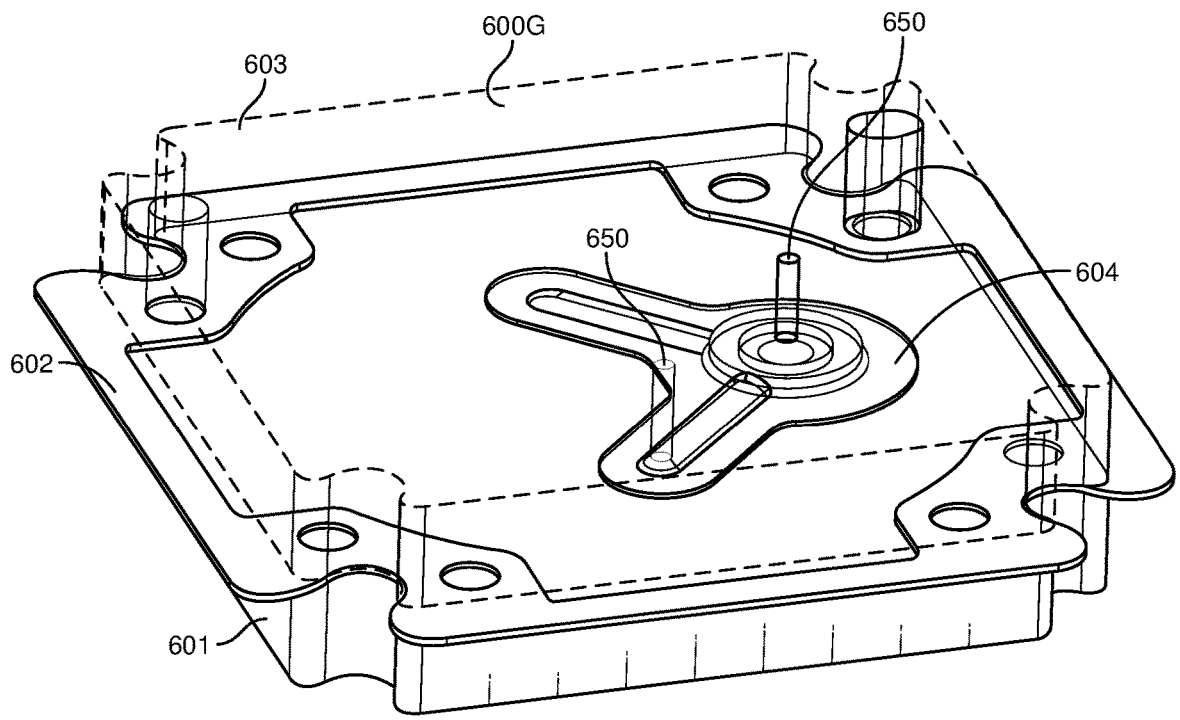
FIG. 13 illustrates an alternative embodiment of a microfluidic control valve.

FIG. 13 illustrates an alternative embodiment of a microfluidic control valve 600G. The microfluidic control valve 600G may include two layers of rigid parts (e.g., layers 601 and 603), with a single shim 602 and membrane 604 in the middle. In this embodiment, the various layers may be held together with epoxy or some other fastening means. The microfluidic control valve 600G may include two fluid ports 650 positioned on the top of the top layer (e.g., the transmission housing layer). It will be recognized, however, that these fluid ports 650 may be placed in other locations in the top layer 603, flowing through channels such as the flow channel 613 of FIG. 11B. Thus, the embodiment shown in FIG. 13 may illustrate two flow paths on top of each other. These flow paths (e.g., source to drain channels) may be configured to use pressure differences to shut off one while turning on the other.

In some examples, a corresponding system may include a positioning module configured to position a membrane on top of a channeled layer. The channeled layer may include a shim portion or shim layer that is dimensioned to limit the amount of compression that may be applied to the membrane. The membrane may be positioned at a juncture in the channeled layer. The positioning module may also position a transmission housing layer over the membrane and the channeled layer. The system may further include a fastening module configured to fasten the channeled layer, the membrane, and the transmission housing layer together with at least one fastening member. As such, the channeled layer, the membrane, and the transmission housing layer may be held together by the fastening member.

Accordingly, using the embodiments described herein, many different types and variations of microfluidic control valves may be manufactured and assembled. In some cases, the various layers of a microfluidic control valve may be individually produced and then clamped together using a power press or other piece of manufacturing equipment. Such production of individual layers and subsequent clamping allows the microfluidic control valves to be produced efficiently at scale. Moreover, it allows the microfluidic control valves to be produced in miniaturized form so that the valves are small enough to fit in or on haptics devices such as gloves. Still further, each microfluidic control valve may be individually designed for a specific application and may include customized channels, gates, transmission elements, controllers and other pieces. Thus, using the embodiments herein, a manufacturer may produce large numbers of these microfluidic control valves quickly and in a cost-effective manner.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive instructions to perform a method of manufacturing, transform the instructions to physical electrical signals, output the electrical signals to perform the method of manufacturing, and verify that the desired product was manufactured according to the received instructions. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. An apparatus comprising:
   a flexible membrane that is positioned at a juncture in a channeled layer, wherein the membrane is configured to deform between an open position allowing fluid flow across the juncture and a closed position inhibiting flow across the juncture;
   the channeled layer which includes a shim portion including a material that is dimensioned to limit the amount of compression appliable to the membrane, wherein the shim portion is positioned along a same plane as the membrane in the open position;
   a transmission housing layer that is positioned over the membrane and over the channeled layer; and
   a fastening member that secures the channeled layer, the membrane, and the transmission housing layer, wherein the fastening member applies compression to a portion of the membrane and to the shim portion.

2. The apparatus of claim 1, wherein the membrane, the channeled layer, the transmission housing layer, and the fastening member form a microfluidic control valve that is connected to one or more pieces of haptic feedback equipment.

3. The apparatus of claim 1, further comprising an electronic controller configured to provide control signals that regulate fluid flow through the channeled layer according to one or more input signals received at the electronic controller.

4. The apparatus of claim 1, wherein the transmission housing layer, the membrane, and the channeled layer are clamped together.

5. The apparatus of claim 4, wherein the channeled layer includes an exhaust port configured to channel exhaust pressure to an exhaust output.

6. The apparatus of claim 1, wherein the channeled layer includes one or more internal pressure sensors embedded within the channeled layer, the internal pressure sensors being configured to determine internal pressures at one or more locations within the apparatus.

7. The apparatus of claim 1, wherein the channeled layer includes one or more external pressure sensors configured to determine external pressures at one or more locations within the apparatus.

8. The apparatus of claim 1, further comprising an electronic feedback component configured to receive electronic feedback that allows control of internal pressure at one or more locations within the apparatus.

9. The apparatus of claim 1, wherein the material of the shim portion is thinner than the membrane.

10. The apparatus of claim 1, wherein the material of the shim portion is more rigid than the membrane.

11. The apparatus of claim 1, further comprising a transmission element housed by the transmission housing layer, wherein the transmission element is positioned and shaped to apply a force to the membrane upon application of a fluid pressure to the transmission element.

12. The apparatus of claim 11, further comprising another membrane coupled to the transmission element, wherein the other membrane is exposed to a gate volume that is configured to be pressurized to apply a fluid pressure to the transmission element to apply the force to the membrane.

* * * * *